Aug. 12, 1952 H. H. SCOTT 2,606,970

METHOD OF AND SYSTEM FOR REDUCING NOISE IN THE TRANSMISSION OF SIGNALS

Filed Jan. 19, 1946 4 Sheets-Sheet 1

INVENTOR
Hermon Hosmer Scott
BY
ATTORNEY

INVENTOR.
Hermon Hosmer Scott
BY David Rines
ATTORNEY

INVENTOR.
Hermon Hosmer Scott
BY David Rines
ATTORNEY

INVENTOR.
Hermon Hosmer Scott
BY David Rines
ATTORNEY

Patented Aug. 12, 1952

2,606,970

UNITED STATES PATENT OFFICE 2,606,970

METHOD OF AND SYSTEM FOR REDUCING NOISE IN THE TRANSMISSION OF SIGNALS

Hermon H. Scott, Lincoln, Mass., assignor, by mesne assignments, to Myron T. Smith, Concord, Mass., trustee Application January 19, 1946, Serial No. 642,411

27 Claims. (Cl. 178—44)

Figure 1:
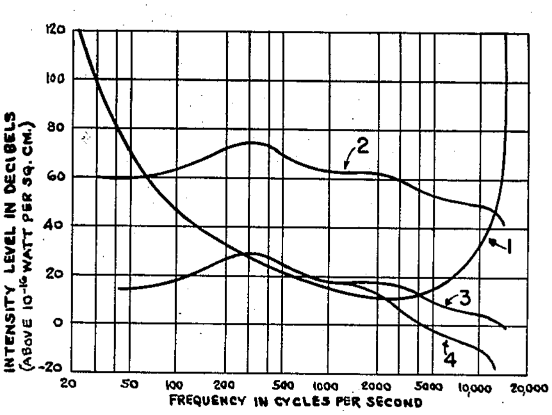

The present invention relates to electric methods and systems, and more particularly to methods of and systems for attenuating or suppressing background noise, interference, and other spurious disturbances during the transmission, the recording, or the reproduction of speech, music, video, and other signals. The term "reducing" or its equivalent will hereinafter be employed generically to include either attenuating or completely suppressing.

Spurious high-frequency noises may be reduced by attenuating the high-frequency components of the signals. The noise, in audio-frequency signals, for instance, is reduced at low-volume levels by reducing the range of the high-frequency overtones that are not normally heard by the ear except at the high-volume levels.

In a noise-reducing system of this character, the low frequencies are not suppressed or altered in the process of eliminating the high-frequency components at the low-volume levels. Though thus eliminating the spurious noise, therefore, the elimination of the high-frequency components may, under some conditions, if audible components are in any way affected, result in loss of apparent brilliance of the reproduced signal, and in a loss of balance or symmetry between the high-frequency and the low-frequency responses.

This may be understood by considering, for example, audio-frequency music signals, the relative balance of which is referred to as aural balance. Aural balance may be defined as the ratio of the audible energy in the treble notes to the audible energy in the bass notes; or the ratio of the reproduced high and low frequencies. Those components only of the energy are taken into account, in this ratio, as are of such frequency and amplitude as to correspond to audible tones at the particular levels at which they exist.

It is also possible, by attenuating the low-frequency components of the signal, to reduce low-frequency noises, such as hum, motor rumble, and noises caused by sprocket devices, such as those used for driving motion-picture film. This may similarly result in destruction of the aural balance, this time resulting from the attenuation near the low-frequency limit of the useful frequency range.

Any modification of the reproduction of either the treble or the bass notes, for a particular level of reproduction, may produce an obvious change in the aural-balance-ratio relationship of the reproduced high and low frequencies. This may become noticeable to the ear as an apparent change in balance, tending to make the reproduction either high-pitched or low-pitched, resulting either in an unduly brilliant or an unnaturally dull or "boomy" quality, depending upon whether the attenuation is more effective at the low or the high frequencies. This is particularly annoying to music-lovers, and tends to obscure fine details in music.

In accordance with the present invention, however, the audible tones are affected to a minimum degree, and any remaining change in balance is compensated for.

If the same listener always heard the program over the same range of levels, and the orchestra always produced exactly the same sound spectrum, it would be a simple matter to determine what frequency ranges could be attenuated or suppressed, without affecting the quality noticeably. In any practical application, however, many variations prevail. The usual type of signal, for instance, does not remain constant. All listeners, again, do not have an equal acuity of hearing. The total sensitivity of the system, from microphone to loudspeaker, moreover, may be varied, or the volume range of the program may be contracted, thus changing the range of listening levels. These factors may result in a condition where, sometimes, the transmitted frequency range of the music is less than the range of the components that would be perceived by the ear. This would impart an unnaturally low-pitched or high-pitched quality to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear.

An object of the present invention, therefore, is to provide a novel method of and system for maintaining a substantially constant balanced relationship between the volume levels of the high and the low frequencies.

Another object of the invention is to provide a novel method of and system for maintaining a substantially constant apparent frequency range in reproduced music and other applications, though actually restricting the range under conditions where noise would be troublesome.

This is especially desirable in practical systems involving the reproduction of music where a change in the balance may be objectionable, particularly if the modification seems to vary with the volume level of the sound. The aural balance between the energy in the treble notes and the energy in the bass notes obtained in accordance with the present invention yields a high degree of apparent fidelity such as to satisfy the ear, even under conditions where frequencies within the audible range for the particular level to be reproduced are attenuated to a degree that would otherwise be noticeable. This allows greater suppression of noise with less noticeable effect upon musical quality than in prior-art systems.

To the attainment of the above ends, a further and important feature of the invention resides in the simultaneous control of both the high and the low frequencies. Although the frequency range may be restricted, under some conditions, relative to other conditions, the relative balance between the high and low frequencies, or the high and low musical tones, is nevertheless maintained substantially constant, and both high-frequency and low-frequency noises are reduced. The reproduction of transients, as judged by the ear, tends also to be improved.

The maintenance of constant aural balance so greatly improves the operation that, in general, the only noticeable effect of the use of the noise-suppressing system is the desired effect, namely, the suppression of noise. It also increases the flexibility of the system with regard to the type of signal, listening conditions, etc.

The desired ends may be attained, in accordance with another feature of the invention, by suitably varying the characteristics of suitable transmitting or filtering means.

Means by which the balance may be restored to a considerable degree by other methods have been described elsewhere. The present invention is concerned more particularly with a method and system that may, under many circumstances, be preferable, or that may be used in combination with the other methods and systems.

Other and further objects will be explained hereinafter, and will be more particularly pointed out in the appended claims.

Figure 2:
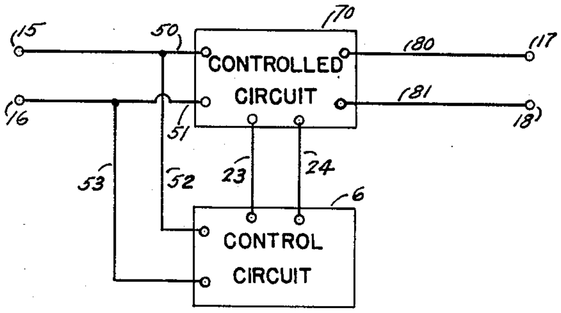
Figure 3:
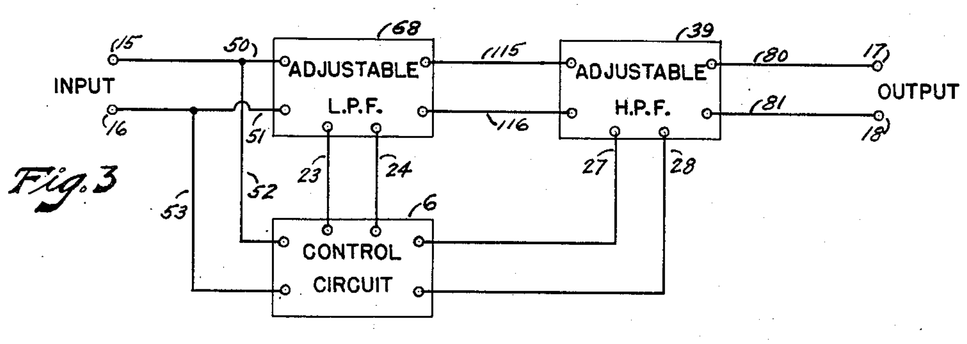
Figure 4:
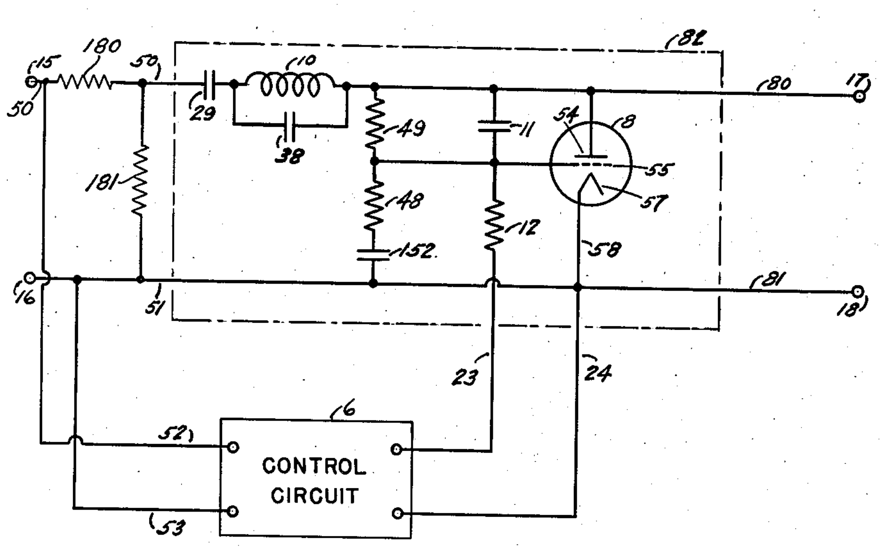
Figure 5:
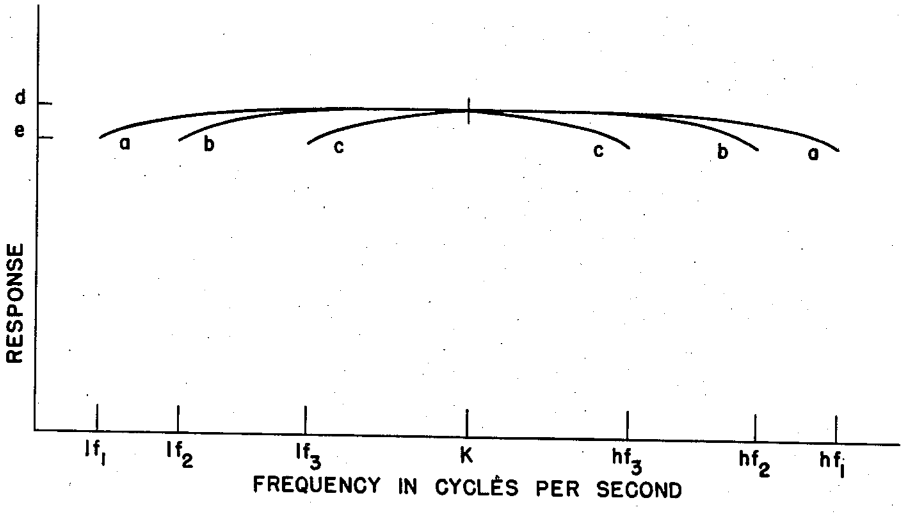
Figure 6:
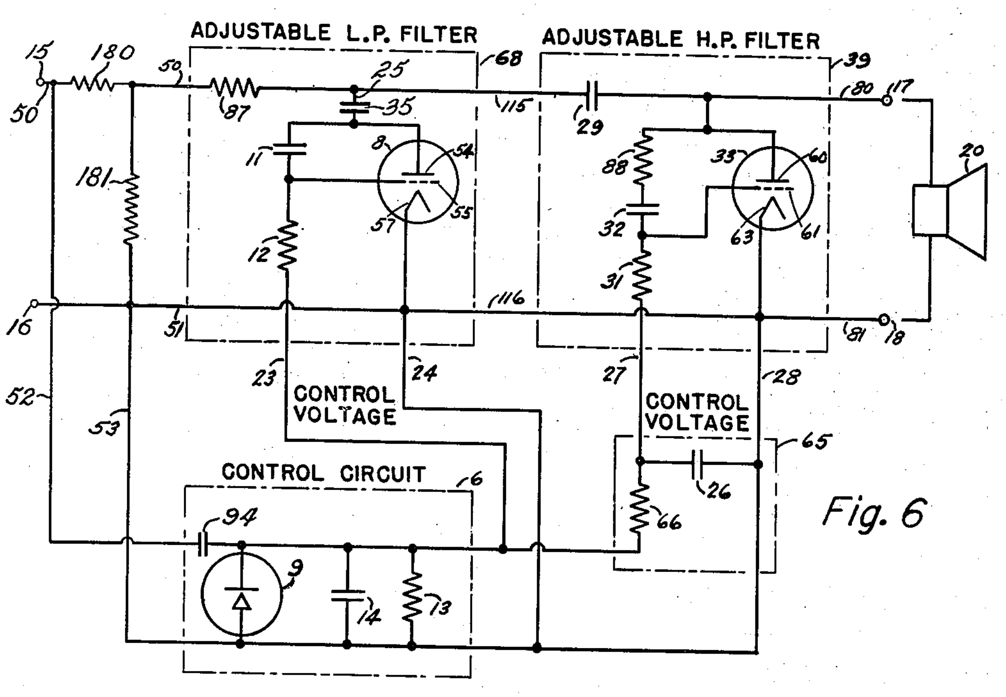
Figure 7:
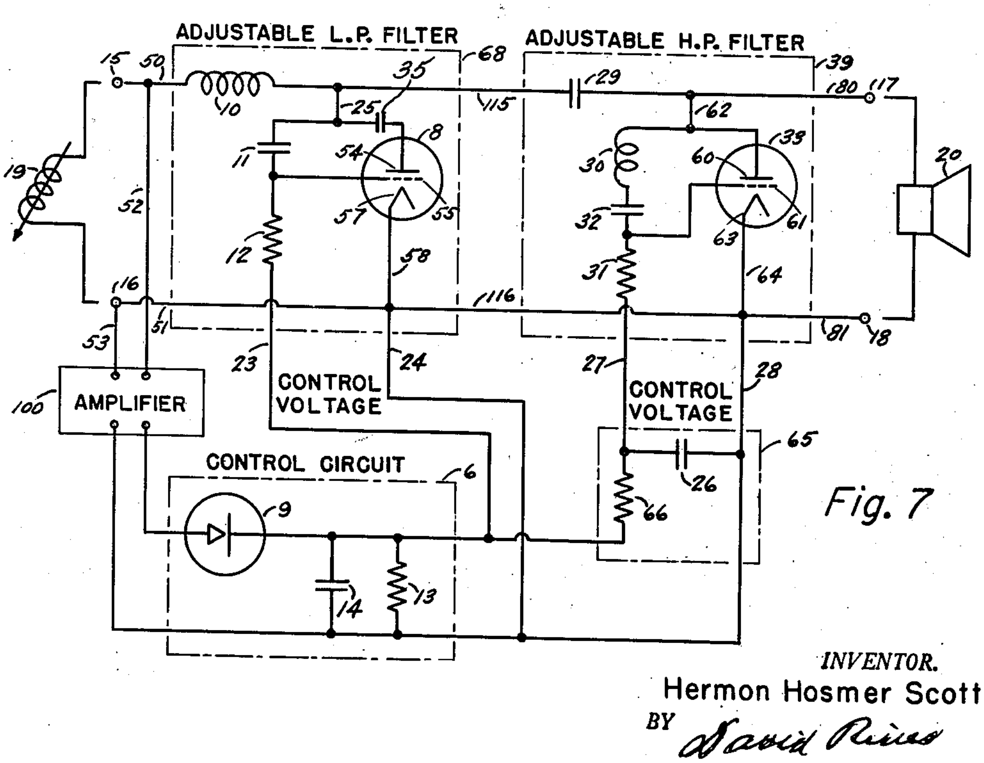
Figure 8:
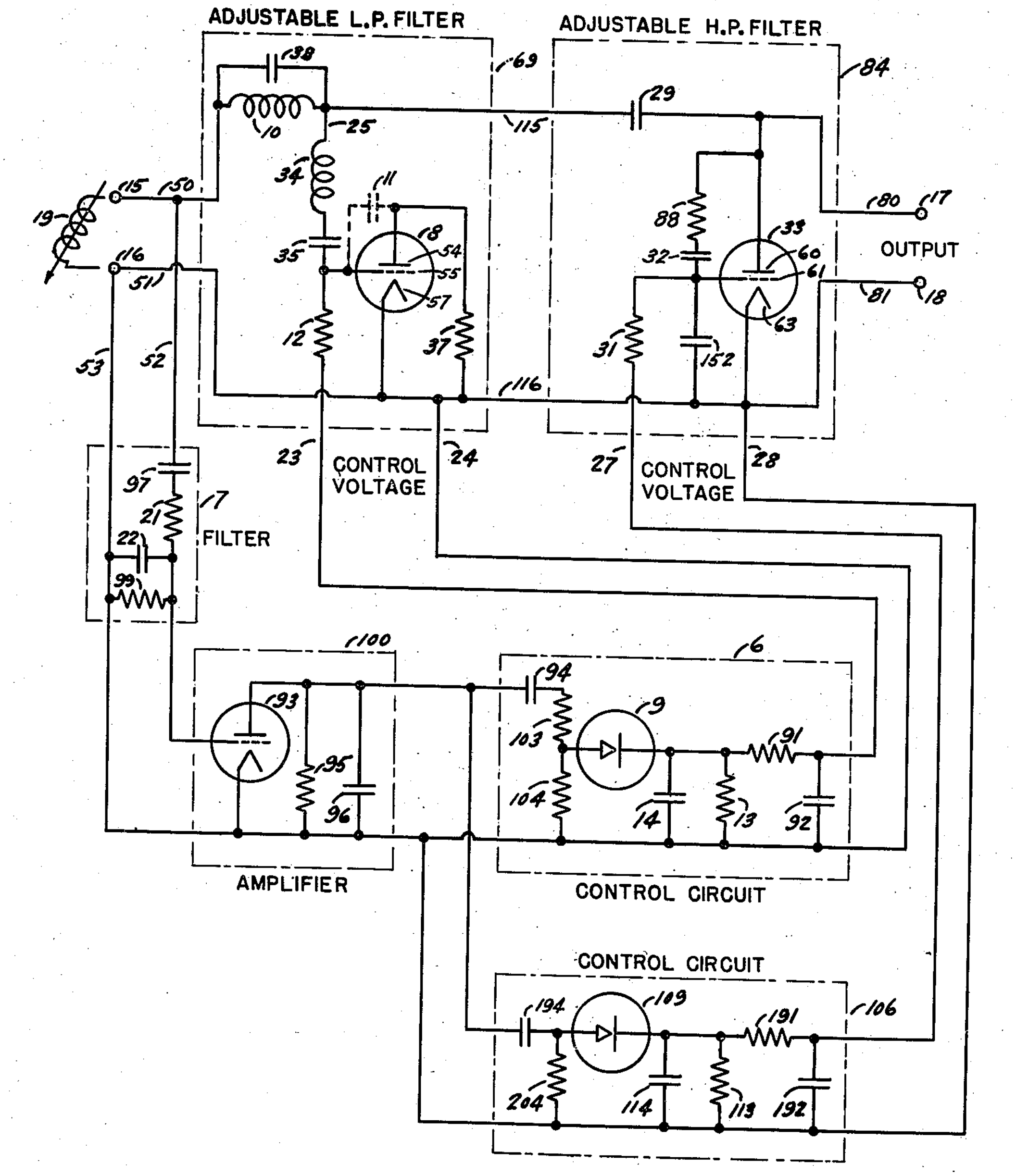

The invention will now be more fully explained in connection with the accompanying drawings, in which Fig. 1 presents a series of graphs representing the frequency-response characteristics of the human ear, and the relative amplitudes and the frequencies of the various components present in a typical signal such as orchestral music, the abscissae being plotted logarithmically in terms of cycles-per-second frequency, and the ordinates being plotted arithmetically in terms of decibel intensity units; Fig. 2 is a block-diagram view of a typical system embodying the present invention, and representative of the circuits and apparatus of Figs. 4, 6, 7 and 8; Fig. 3 is a similar but more detailed view representative of the circuits and apparatus of Figs. 6, 7, and 8, employing two adjustable filters, one high-pass and the other low-pass; Fig. 4 is a diagrammatic view of circuits and apparatus embodying the form of the invention diagrammatically illustrated in Fig. 2, and employing but a single adjustable band-pass wave filter; Fig. 5 presents explanatory diagrams of typical frequency-response curves, with the abscissae, as in the case of Fig. 1, plotted logarithmically, in terms of cycles-per-second frequency, and with the ordinates plotted arithmetically, in terms of decibels-units response; Fig. 6 is a diagrammatic view of circuits and apparatus embodying the form of the invention diagrammatically illustrated in Fig. 3; Fig. 7 is a view similar to Fig. 6 of a modification embodying details of the system illustrated in Fig. 3 and Fig. 8 is a similar view of another modification.

Though the method and system described here are applicable wherever the degree of perception of the signal-receiving means varies with the characteristics of the signal, and wherein balance between the high and the low frequencies, or two bands of frequencies, is important, the invention, for concreteness, will be explained, as it applies to a typical application, namely, the reproduction of music and similar signals by a phonograph or a radio.

From the curve 1 of Fig. 1, representing the threshold of hearing-sensitivity for an ordinary human ear, it appears that the ear is most sensitive in the region around 2,000 cycles, and that the sensitivity falls off rapidly at both lower and higher frequencies.

The curve 2 may be considered to be representative of the energy-distribution characteristics, as a function of frequency, of typical orchestral music at a particular level. When shifted along the axis of ordinates, to correspond to changes in the volume or intensity of the sound, as in response to a volume control, or an attenuator, it intersects the threshold curve 1 at points representing different frequencies. These points represent the limits of the frequency range necessary to reproduce satisfactorily for the listener particular types of signal at the particular volume or intensity levels. If the level of the curve 2 is reduced equally throughout the range, for instance, to occupy the position of the curve 3, the necessary or perceptible range of frequencies is seen to become accordingly restricted, from about 70 cycles to about 250 cycles at the low-frequency portions of the curves 2 and 3, respectively and from about 12,000 cycles to about 4,000 cycles at the high-frequency portions of the curves 2 and 3, respectively. If the music or other signal should have frequency components outside these ranges, they would not be audible.

Most musical instruments, when played softly, moreover, produce a mellower tone than when played loudly, thus indicating the presence of fewer harmonics or overtones falling within the higher-frequency ranges. While the curve 2, as before stated, may become transformed into the curve 3 when the sensitivity of the transmission means is reduced, therefore, it may actually become transformed into the still lower curve 4 if the reduction of volume or intensity is caused by the orchestra playing more softly. The lower curve 4 shows that the before-mentioned low-level limit of 4,000 cycles may thus become reduced to about 2,500 cycles or less when the orchestra is playing softly; the greater portion of the audible energy is below this 2,500-cycle value. Since most music, by its very nature, covers an appreciable volume or intensity range, this characteristic offers the further advantageous feature, therefore, that it allows further restriction of the frequency range of the transmission equipment at low-volume or low-intensity levels, from about 4,000 cycles to about 2,500 cycles, without seriously impairing the quality, as perceived by the ear. A similar situation exists for speech and vocal music.

The suppression of noise according to the present invention is based upon these and similar factors.

The curves 2 and 4 may, therefore, be regarded as representative of typical signals involving high and low volume or intensity levels, such as may be encountered in the reproduction of music and similar signals, the curve 2 being at an average volume or intensity level of, say, 63 decibels in the region around 1,000 to 2,000 cycles, which contributes most to the loudness as heard by the ear, and the curve 4 at a volume or intensity level of approximately 18 decibels in the same range.

In some applications, the high-frequency noises are more annoying than the low-frequency noises; meaning, in music, mainly the range of bass fundamentals, below about 250 cycles, in the region where the human ear is relatively insensitive at low levels. When the high-frequency noises are reduced, however, the low-frequency noises become more manifest, so that it becomes then desirable to control the low-frequency components also. It is often, therefore, desirable to provide control of both ends of the frequency spectrum when reproducing recorded music or other signals, because of the attendant reduction of hum, motor-rumble, etc., as well as high-frequency noise.

When the orchestra plays loudly, it is desirable to reproduce, in so far as the rest of the system is capable of doing so, the entire range of high, medium, and low frequencies, up to about 12,000 cycles; otherwise, the reproduction will fail to include some of the audible components of the music signal represented by the curve 2. When the orchestra plays softly, however, the medium-frequency range up to about 2,500 cycles is all that is needed, as demonstrated by the curve 4; all the frequencies above about 2,500 cycles may then be eliminated without any serious effect upon the reproduced music. At intermediate levels, of course, only intermediate ranges are required.

If the system, through other limitations, is not able to reproduce satisfactorily the entire range up to 12,000 cycles, it may be possible, at low levels, to restrict the high-frequency range to a limit considerably lower than 2,500 cycles, at low levels, without further noticeably impairing the quality of reproduction as compared with high levels.

If the type of signal differs appreciably from that represented by the curves 2 and 4, however, if the listener's acuity of hearing differs from that represented by the curve 1, or if the level of reproduction is increased, some of the frequencies that are attenuated may lie within the range perceptible to the listener.

If the transmitted range of the music is less than the range of the components that would be perceived by the ear, an unnaturally low-pitched or high-pitched quality would be imparted to the music, depending upon whether the reproduced signal is most deficient in the high or the low frequencies, respectively. It is desirable, therefore, not merely to reduce noise and other components lying in certain frequency ranges, but also to accomplish the reduction in such a way as to minimize any resulting change of balance that might be perceived by the ear under conditions varying from the exact conditions as typified by the curves of Fig. 1.

As before indicated, one of the objects of the present invention is to maintain the apparent quality of reproduction approximately constant, even though the signal and the conditions should vary somewhat from those represented by the curves of Fig. 1.

The apparent depth or brilliance of the reproduction of the music, for example, is a function, not merely of the frequency range, but also of the balance between the high-frequency-response and the low-frequency-response characteristics. The over-all frequency-response curves *a*, *b*, and *c* of Fig. 5 represent the ratio of the output voltage or power to the input voltage or power, plotted in terms of frequency. They may be obtained, for example, by applying a constant-voltage variable-frequency signal to the input terminals 15 and 16, and measuring the response at the output terminals 17 and 18. The frequency-response curves *a*, *b*, and *c* are shown extending from low frequency to high frequency, thus representing both the low-frequency and the high-frequency limits. They are essentially flat and smooth between the low-frequency limit $lf_1$ and the high-frequency limit $hf_1$ of the frequency-response curve *a*, the low-frequency limit $lf_2$ and the high-frequency limit $hf_2$ of the curve *b*, and the low-frequency limit $lf_3$ and the high-frequency limit $hf_3$ of the curve *c*.

It will be observed that the low-frequency limits $lf_1$, $lf_2$, and $lf_3$ and the high-frequency limits $hf_1$, $hf_2$, and $hf_3$ of the respective frequency-response curves *a*, *b*, and *c* are disposed approximately symmetrically with respect to a central point K. It is desirable, for reproduction pleasing to the ear, to retain this symmetry or balance between the high and the low frequencies. If the high-frequency components are reduced or eliminated, for example, it is desirable, in order to maintain the balance, to effect a corresponding reduction or elimination of the low-frequency components also.

Let it be assumed that the usable limits are obtained when the response is at some particular value, represented by the level *e* of Fig. 5, below the response in the medium-frequency range, represented by the higher level *d*. In order to obtain constant balance between the treble tones and the lower notes in the reproduction, it is recognized, as a rough "rule of thumb," that the product of the lowest and the highest frequencies reproduced should be approximately constant. The square root of this product, or the root-mean frequency K, has been variously recommended at values from 200 to 1,000 cycles. Though there is thus difference of opinion as to the best value of *k* to select, it is agreed that, in a system for reproducing music, in order to avoid an apparent change in the depth or brilliance of the reproduction, the value K, whatever the selection, should remain substantially constant under all conditions of reproduction.

This simple explanation is generally applied to systems having gradual or, at any rate, similar cut-off characteristics at both the high-frequency and the low-frequency ends. In some cases, however, the cut-offs may be resonant or have other characteristics that tend to increase the level or the duration of the frequency components near cut-off. It is not so easy, in such cases, to determine mathematically the best balance between the high and low frequencies. The balance may, in such cases, however, be obtained experimentally, through listening tests. In accordance with the present invention therefore, it is not necessary to keep K always absolutely constant. It is sufficient merely so to control the high and the low frequencies that, at any steady-state-level condition, they shall be reproduced in a predetermined relationship.

According to a feature of the present invention, a balance is maintained between the low and the high frequencies by suitable control of both. The frequency range is controlled without destroying the apparent balance between the high and low frequencies. Noises lying in either the high-frequency or the low-frequency range may thus be reduced without destroying the aural balance.

Referring now to Fig. 2, when an input signal, as from a phonograph pick-up, a radio-receiver, or another source 19 (Figs. 7 to 10), is applied to the input terminals 15 and 16, it is transmitted, by input-lead conductors 50 and 51, through a controlled circuit 70, and by way of output-lead conductors 80 and 81, to the output terminals 17 and 18. These may be connected to any output load 20 (Figs. 6, 7, and 9), such as a loudspeaker, an amplifier, or a radio transmitter.

The controlled circuit 70 may, for example, be the wave filter 82 shown in Fig. 4, the filters 68 and 39 of Figs. 3, 6, and 7, or 69 and 84 of Fig. 8, the amplifiers 40 and 41 of Fig. 9, the amplifiers 75 and 42 of Fig. 10, or the amplifiers 40, 41, and 142 of Fig. 11. The transmission paths provided by the amplifiers 40 and 41 of Fig. 9, the amplifiers 75 and 42 of Fig. 10, and the amplifiers 40, 41, and 142 of Fig. 11 are respectively connected in parallel.

The controlled circuit 70 may be designed to pass normally only a restricted range of frequencies at low-volume levels. This may be expanded to the full range that it is desirable to transmit at high-volume levels; say, from about 70 to about 12,000 cycles, or from about 90 to about 8,000 or more cycles, or any other range, depending upon the application and the limitations of associated equipment. The controlled circuit 70 may also be designed so that it shall be able to attenuate or completely suppress, at low-volume levels, in predetermined ratio, the higher and lower ranges of frequencies; say, the high-frequency components above about 2,500 cycles and the low-frequency components below about 250 cycles, or some similar values, depending upon the application and other factors.

Referring to the practical circuit illustrating the circuit of Fig. 2 that is shown in Fig. 4, the adjustable band-pass wave filter 82 may be controlled in accordance with the level of the input signals to reduce both the high-frequency and the low-frequency components of the input signal at, say, above about 2,500 cycles and below about 250 cycles, respectively. This control may take place, in accordance with a feature of the present invention, at low-volume levels of the medium and low frequencies of the input signal; say, below about 2,500 cycles. Within the term "low-volume levels," of course, is included levels of zero volume.

The control may alternatively be derived, not from the input, but from the output voltage of the system, under the control of the output signal, at the output level. The terminals 15 and 16 may represent the input and the terminals 17 and 18 the output, or vice versa.

The wave filter 82 is essentially a band-pass half-section comprising a capacitance 29 and an inductance 10, series connected in the input lead 50, and a variable simulated shunt reactance connected across the output leads 80 and 81. The shunt reactance comprises a reactance tube 8, provided with a feed-back network comprising a condenser 11 and a resistor 49 connected in parallel between its anode or plate 54 and its control-grid electrode 55, and a resistor 48 and a capacitor 152 connected in series between the grid 55 and the cathode 57. As will be explained presently, the reactance tube 8 functions as a capacitance at high frequencies and an inductance at low frequencies. The anode 54, the condenser 11, and the resistor 49 are connected in parallel to the output lead 80, and the cathode 57 of the tube 8 is connected to the input lead 51 and the output lead 81 by a conductor 58.

The series inductance 10 and capacitance 29 and the simulated variable reactance of the reactance tube 8 shown in Fig. 4 form, in effect, a band-pass filter yielding substantially no attenuation within a given band, and a high degree of attenuation outside of that band. This is distinguished from prior-art circuits which have only a gradually changing loss characteristic and that must, by their very nature, cause order to produce noticeable noise suppression serious attenuation within a desired band in order to produce noticeable noise suppression above that band. If desired, the inductance 10 may be tuned with a capacitance 38 to provide a peak of attenuation at some frequency.

The attenuation or suppression is under the control of a control circuit 6. The control circuit 6 is of such nature as to produce no noticeable effect upon the quality of the reproduction. The input side of the control circuit 6 is subjected to the action of the input signal from the signal source 19 through the medium of lead conductors 52 and 53 respectively connected to the input leads 50 and 51. The control circuit 6 is designed so as automatically to shift the response range of the controlled circuit 82, which corresponds to 70 in Fig. 2.

The output of the control circuit 6 is connected, by a conductor 24, to the cathode 57 and, by a conductor 23, through a resistor 12, to the control grid 55. The resistor 12 thus transmits bias voltage from the control circuit 6 to the grid 55. The grid bias thus developed in the system of the control circuit 6 is therefore transmitted by the leads 23 and 24 to the adjustable filter to impress an adjustable control voltage from the output of the control circuit 6 upon the grid 55.

The capacitance 11, the resistances 12, 48, and 49, and the capacitance 152 are so connected as to provide a feed-back network between the plate or output and the grid or input circuits of the reactance tube 8. This feed-back provides a phase shift of approximately 90° between the plate voltage and the grid voltage of the reactance tube 8, at high and low frequencies, so that the plate current shall lead the plate voltage by approximately 90° at high frequencies, and shall lag at low frequencies. The plate or output current of the tube 8, with its associated circuits, therefore, as before stated, functions as a reactance. Equivalent circuits for effecting this result may, of course, be used. The magnitude of the simulated reactance of the reactance tube 8 is a function of the transconductance of the tube 8, and this, in turn, is a function of the electrode voltages.

The adjustments are such that the control circuit 6 automatically adjusts the cut-off frequencies of the filter 82 so as to attenuate all frequency components of the input signal above and below predetermined values, such as 2,500 cycles and 250 cycles, respectively, at low-volume or low-intensity levels of the signal, or predetermined ranges of the signal. The spurious noises accompanying the high-frequency and low-frequency components are thus eliminated at low-volume levels with a minimum effect upon the tone quality. The system thus adjusts itself automatically to the signal to be transmitted.

Depending upon the normal ratio of signal levels and biases which may be used with practical tubes, it may be desirable to add attenuation to the circuit, as shown in Figs. 4 and 6 in the leads 50 and 51, or gain to the circuit, as shown in Figs. 7 and 8 in the leads 52 and 53, to provide best operating conditions for the vacuum tube.

Most treble tones, or high musical fundamentals, lie below the typical high cut-off frequency of about 2,500 cycles, and are of medium frequencies, say, between 250 and 2,500 cycles. For the larger part, the relatively-high frequencies that are attenuated in accordance with the present invention are the harmonics or overtones of these treble fundamentals plus a few extremely high treble fundamentals constituting a small portion only of the total energy in the music.

The characteristics of the control circuit 6 should be so selected for each range as to insure the best performance with the intended type of signal.

Where a considerable degree of noise suppression is required, with a minimum effect upon the audible quality, there should be substantially no attenuation within the range of frequencies perceived by the ear, and the attenuation beyond the highest perceptible frequency should be as great as possible. The transmission-cut-off characteristics should therefore be as sharp as possible with apparatus that is economically practicable.

According to the system of Fig. 3, the band-pass filter 82 of Fig. 4 or the controlled circuit 70 of Fig. 2 is replaced by two filters 68 and 39; the former, low-pass, for reducing the high-frequency components, as above 2,500 cycles; and the latter, high-pass, for reducing the low-frequency components, as below 250 cycles. The practical advantage of this is that the low-pass filter 68, that attenuates the higher frequencies, as will be more fully described hereinafter, may be made to function much more rapidly than the high-pass filter 39, which controls the lower frequencies, without introducing noticeable spurious components into the signal in the output of the system as the result of the control operation. This improves the reproduction of transients.

In Fig. 7, which shows a detailed version of the system of Fig. 3, the pick-up 19 and the load 20 are shown symbolically as typical source and load, and may be provided with amplification and the like, where necessary.

The output conductors 115 and 116 of the low-pass filter 68 lead to the input of the high-pass filter 39, and the output of the high-pass filter 39 is connected by the output conductors 80 and 81 to the output terminals 17 and 18.

According to the practical circuit illustrating the system of Fig. 3 that is shown in Fig. 7, for example, the input connections of the low-pass filter 68 are similar to those of the band-pass filter 82 of Fig. 4. The output connections of the control circuit 6 to the low-pass filter 68 are also substantially the same as in the system of Fig. 4. The connections of the reactance tube 8 of the low-pass filter 68, however, are of a somewhat different type from those in Fig. 4. The reactance tube 8, in the low-pass filter 68, serves throughout as a variable shunt capacitance. The anode 54 and the condenser 11 are shown connected in parallel to the lead 115 by a lead conductor 25.

The input connections of the control circuit 6 of Fig. 7 are shown substantially the same as those of Fig. 4. The control circuit 6 of Fig. 7 may exercise such control over the low-pass filter 68 as to cause the reduction of the high-frequency components of the input signal, say above about 2,500 cycles, at the low-volume levels of a signal or the medium- or the low-frequency components of a signal such as that represented by the curves 2 and 4 of Fig. 1.

The said filter 39 of Fig. 7 is essentially a high-pass half-section comprising a series capacitance 29, opposite sides of which are connected to the leads 80 and 115, and a variable simulated shunt inductance connected across the leads 80 and 81. The shunt inductance comprises an inductive-reactance tube 33, provided with a feed-back network connected between its anode or plate 60 and its control-grid electrode 61. The feed-back circuit, introducing a phase lag of approximately 90° between the plate voltage and the grid voltage of the reactance tube 33, at low frequencies, comprises a series-connected inductance 30 and blocking condenser 32 connected across its anode or plate 60 and its control-grid electrode 61, and a resistor 31. The plate or output voltage of the tube 33, with its associated circuits, therefore, functions as an inductor. Equivalent circuits for effecting this result may, of course, be used, as shown, for instance, in filter 84 of Fig. 8. The anode 60 and the series-connected inductance 30 and blocking condenser 32 are connected, in parallel, to the lead 80 by a conductor 62, and the cathode 63 of the tube 33 is connected to the lead 81 by a conductor 64.

In the system of Fig. 7, therefore, the filters 68 and 39 are both of the all-reactance type. The reactance tube 8 simulates a variable capacitance, and the reactance tube 33 a variable inductance.

The resistor 31 is connected between the control circuit 6 and the grid 61 by a conductor 27, similarly to the connection of the resistor 12 between the grid 55 and the conductor 23. The conductor 28 corresponds similarly to the conductor 24. The control circuit 6 thus controls the high-pass filter 39 similarly to the control of the low-pass filter 68.

The output connections of the control circuit 6 to the filter 39 may embody an additional R-C filter 65 for the control voltage applied from the control circuit 6 to the high-pass filter 39. The filter 65 is shown comprising a shunt capacitance 26 and a series resistance 66. Though not absolutely necessary, the presence of this additional filter 65 permits of slower control of the low-frequency range by the high-pass filter 39 than of the high-frequency range by the low-pass filter 68. This also reduces a tendency to introduce spurious components into the high-pass filter 39 as a result of the control action.

The control circuit 6 is shown in Fig. 7 as comprising a series rectifier 9 for rectifying the signal, connected in the control-circuit-input lead 52, and a condenser 14 connected across the control-circuit-input leads 52 and 53. The condenser 14, which bypasses signal voltages between the conductors 23 and 24, may be located in associated circuits. The resistance of the rectifier 9 and the capacitance of the condenser 14 provide an R-C filter circuit for reducing the high-frequency components of the rectified signal voltage. A leak resistor 13 is connected in parallel with the capacitance 14. The rectified voltage of the control circuit varies in accordance with the amplitude of the signal applied to the input terminals 15 and 16.

The time constants of the rectifier 9 and the condenser 14 should be so chosen as to allow for rapid expansion of the high-frequency range without introducing spurious noises into the output circuit. The resistance of the leak resistor 13, on the other hand, should be relatively high in value, so that the response of the system shall not contract suddenly, and thus accentuate vibrato or other musical effects. The system should contract at approximately the same rate as the decay of reverberation in normal music.

In the practical embodiment of the system of Fig. 3 that is illustrated in Fig. 6, the adjustable low-pass filter 68 and the adjustable high-pass filter 39 may both be of the R–C type. The filter 39 is shown comprising a series condenser 29 and a shunt impedance, comprising the reactance tube 33 and its feed-back circuit consisting of a capacitor 32 and a resistor 38 connected between the grid 61 and the anode 60 in replacement for the inductor 30. In the filter 68 of Fig. 6, the inductor 10 is replaced by a resistor 87. The reactance tube 8 of the filter 68 may simulate a variable capacitance. The corresponding reactance tube 33 of the filter 39 may simulate a variable resistance.

The control circuit 6 of Fig. 6 is shown as of a slightly different type, in that the rectifier 9 is connected in parallel with the parallel-connected condenser 14 and resistor 13, instead of in series therewith. These control circuits are interchangeable, and may be used in the systems of any of the figures, with or without extra amplifiers or filters.

The variable low-pass filter 69 shown in Fig. 8, as a modification of the low-pass filter 68 of Fig. 7, has improved characteristics. The series arm of the filter containing the inductor 10 is tuned by means of a parallel-connected capacitor 38 to provide a parallel-resonant circuit. This provides a corresponding fixed point of high or substantially infinite attenuation above the cut-off of the normal transmission range, where the capacitor 38 resonates with the conductor 10. This improves the attenuation of the filter above cut-off. By eliminating the tuning condenser 38 in the series arm, the fixed point of high attenuation may be eliminated, where not necessary.

A second inductor 34, connected in series with the conductor 25, and therefore in series with the variable reactance of the reactance tube 8, forms a series-resonant circuit with the simulated capacitance of the reactance tube 8. This provides a point of high attenuation, which may be just above the cut-off frequency, that is variable with the cut-off frequency. This variable point may vary in a predetermined relationship with respect to the cut-off frequency. It may vary from a low value, such as 2,500 cycles, to a high value, such as 8,000 cycles or higher, depending upon the characteristics and the limitations of other parts of the system. A resistor 37 may be connected in the output circuit of the reactance tube 8.

Each of these fixed and variable cut-off points assures an extremely sharp cut-off. This filter, therefore, provides unusually sharp cut-off and unusually high attenuation above cut-off, allowing of rapid control.

This circuit therefore functions as a combination mid-series and mid-shunt-m-derived filter having an exceedingly sharp variable high-frequency cut-off characteristic with a very high degree of attenuation above cut-off, and it may have a predetermined amount of resonance in the region of cut-off, thus to increase the response in that region. This type of filter may be varied very rapidly, in accordance with the control voltage or current, without introducing spurious components of the control voltage into the output circuit of the filter.

The fixed point of high attenuation should generally be placed above the normal-operating range. For reproducing ordinary shellac phonograph records, which contain frequencies up to approximately 8,000 cycles, 9,000 cycles is a good value for this purpose. If the system is to be used also for the reception of amplitude-modulated radio broadcasts, 10,000 cycles, which is the difference between adjacent channels, is a desirable value, as the 10,000-cycle attenuation will reduce also the heterodyne whistles. For program sources involving higher frequencies, of course, this fixed attenuation point may be set at a still higher frequency.

The said fixed and variable points of high attenuation are points at each of which the attenuation reaches a maximum with respect to adjacent higher and lower frequencies, and are determined by series or shunt resonance in one of the filter arms. If the resonant circuits causing the points of high attenuation had no loss whatever, or no resistive component, the attenuation at those points would be infinite.

Any impedance connected to the input leads 50 and 51, such as the pick-up 19, or any interposed amplifier or network, may have an impedance sufficiently low so as to provide a certain amount of resonant rise in the filter characteristic below cut-off, or less than critical damping for the resonant circuits in the filter. This tends to provide a certain amount of compensation to the ear for the cut-off of the higher frequencies under conditions where frequencies that might be audible may be attenuated, as may occur upon the application of a sudden loud transient.

The resonant effect is improved by connecting a high impedance across the leads 115 and 116. This condition of resonance may exist at high-signal levels only momentarily, while the cut-off characteristic is shifting to a higher frequency. The resonant condition is therefore not apparent to the ear as such.

Resonance may similarly be introduced into the high-pass filter 84, if desired.

A condenser 35 may be connected in series with the inductance 34, or with the lead 25, in series with the reactance tube 8. It may be used for blocking or tuning purposes only, or it may be utilized also to improve the control characteristics of the filter. If used, it will, in effect, form a high-pass filter with the inductance 10. This filter will shunt to the low-voltage side of the system, through the input circuit of the filter, any spurious low-frequency-audio components of the control voltage that may reach the control grid 55 from the control circuit 6, and that might otherwise have appeared at the output terminals 17 and 18.

A similar effect may be obtained, in the systems of Figs. 6 and 7, by inserting a blocking condenser 35. In the systems of Figs. 6 and 7, this is particularly effective when the input circuit is connected to a relatively low impedance; and this, as already explained, will also improve the cut-off characteristic. Rapid control of the circuit may thus be obtained without "thumps" or other audio components of the control voltage applied to the grid 55 that might appear in the output circuit.

The control circuit of Fig. 8 is shown including extra amplification 100 and filtering 7 to provide optimum control characteristics. This may be in accordance with the characteristics of the human ear, or for any desired range of frequencies. The control circuit may pass frequencies outside of the controlled range only, thus providing improved discrimination against noise.

The filter 7 may, therefore, prevent the control circuits 6 and 106 from operating on signals in the eliminated range of frequencies or may provide a sensitivity characteristic approximating that of the ear. This is desirable when the applied signal may have strong high frequency or low frequency noise components, particularly when such components are at levels higher than the desired components. An amplifier 100 (shown also in Fig. 7) is inserted in leads 52 and 53 to increase the magnitude or the effectiveness of the control voltage.

The control circuit 6, which controls the transmission of the filter 82, is thus actuated by signals obtained through filter 7. The purpose of this and similar filters is to reduce the sensitivity of the control means in the frequency ranges being controlled, thus to prevent the transmission of high-level noise in those ranges.

In the case of signals such as those depicted by the curves 2 and 4, where the volume level is always greatest in a range not being controlled, the control will still reside with the signal, rather than with the spurious noise, even though the filter 7 be not employed, providing that the spurious noise is always at a lower level than higher-frequency components of the desired signal.

The wave filter 84 of Fig. 8 is essentially a high-pass half-section comprising the reactance tube 33 that may function either as a variable resistance or a variable inductance, depending on the size of a condenser 152, connected between the grid 61 and the cathode 63.

The input-filter network 7 embodied in the system of Fig. 8 is shown comprising a condenser 97 and a resistor 21 connected in series in the control-input conductor 52, followed by a capacitor 22 and a resistor 99 connected in parallel across the circuit to reduce the sensitivity to very high and low frequencies. The filter 7 is connected in the input circuit of the amplifier 100 for increasing the magnitude of the control voltage and also for providing additional filtering. The amplifier 100 may comprise a vacuum tube 93 the output circuit of which is provided with a resistor 95. A condenser 96 in parallel with the resistor 95 further reduces the high-frequency response. A series condenser 94 in the input circuit of the control circuit 6, and serving as a blocking condenser between the amplifier 100 and the control circuit 6, may function also to reduce the sensitivity at low frequencies.

The same filter 7 and the same amplifier 100 may be connected to two control circuits 6 and 106, in parallel, for respectively controlling the low-pass filter 69 and high-pass filter 84. Corresponding elements of the control circuit 106 are represented in Fig. 8 by the same reference numerals as for the control circuit 6, but augmented by 100. The resistor corresponding to the resistor 103, however, in series with the condenser 94, is not shown in the control circuit 106. This resistor merely serves to adjust the relative sensitivity of the two control circuits. An equivalent resistor could be used in the control circuit 106.

The function of the shunt capacitors 22 and 96 is to reduce the sensitivity of the control system at very high frequencies, so that the control shall be essentially in accordance with frequencies where the ear is most sensitive. The function of the series capacitors 97, 194, and 94 is to reduce the response at very low frequencies below the cut-off frequency, where the ear is relatively insensitive, and most of the signals may consist of a rumble, hum, or other components. Essentially the result of the control of the circuit may be approximate to the sensitivity characteristics of the ear for the type of signal to be reproduced.

More elaborate filter and amplifier circuits may be used where warranted.

All the tubes are operated within their normal ratings.

The sections 6 and 106 of the control circuit each utilizes an accompanying output filter for filtering the control voltage comprising a resistor 91 and a parallel capacitor 92, and a series resistor 191 and a parallel capacitor 192, respectively. This allows the high-pass filter, which controls the lower frequencies, to be controlled somewhat more slowly than the high-pass filter, which controls the low frequencies. Better filtering of the rectified control voltage is thus provided for, increasing further the speed of control without introducing spurious "thumps" into the output. While, for any steady-state conditions, the two filters should respond in a predetermined relationship under conditions of rapid expansion or contraction, it is desirable to control also the low-pass filter 69 much more rapidly than it is generally practical to control the high-pass filter 84.

The following typical values of the elements employed in the system of Fig. 8 have been found to be very effective, in practice:

| | |
|---|---|
| Inductor 10 | 2 henries |
| Capacitor 38 | 140 micromicrofarads, approx. |
| Inductor 34 | 0.4 henry |
| Capacitor 35 | 0.01 microfarad |
| Capacitor 11 | 60 micromicrofarads, approx. |
| Vacuum tubes 8, 33, and 93 | 6SJ7 |
| Resistor 37 | 150,000 ohms |
| Resistors 12, 31, 88, 91, and 191 | 1 megohm |
| Resistors 13 and 113 | 5 megohms |
| Capacitor 14 | 0.01 microfarad |
| Capacitor 92 | 0.003 microfarad |
| Resistor 95 | 250,000 ohms |
| Capacitors 94 and 194 | 300 micromicrofarads |
| Resistors 21, 95, 99, 104, and 204 | 500,000 ohms |
| Capacitor 97 | 500 micromicrofarads |
| Capacitors 22 and 96 | 200 micromicrofarads |
| Rectifiers 9 and 109 | 6H6 |
| Capacitor 98 | 200 micromicrofarads |
| Capacitors 32 and 152 | 0.005 microfarad |
| Capacitor 29 | 0.02 microfarad |
| Resistor 103 | 100,000 ohms |
| Capacitors 114 and 192 | 0.05 microfarad |

The filter sections shown in the diagrams are simple half sections which may obviously be combined in various manners as is well known in the art. Similarly, various equivalent circuits which will function in the same manner may be substituted.

In accordance with usual conventions in the showing of vacuum-tube circuits, the well known operating-voltage sources, like batteries, power supplies, voltage dividers, bias resistors, transformers, etc., are not illustrated. It will also be understood that, in any practical system, it may be desirable to add amplifaction or attenuation, so that the best operating conditions may be obtained.

Further modifications will also occur to persons skilled in the art, and all such are considered to fall within the spirit and scope of the present invention, as defined in the appended claims.

What is claimed is:

1. In the transmission of unmodulated signals having relatively-low-frequency components, relatively-high-frequency components, and components of medium frequency, a method of the character described that comprises reducing the relatively-low-frequency and the relatively-high-frequency components at low signal levels, controlling said reduction by the level of said unmodulated signals and maintaining a predetermined relationship between the relatively-low-frequency components and the relatively-high-frequency components.

2. In the transmission of unmodulated signals accompanied by spurious signals and having relatively-low-frequency components, relatively-high-frequency components, and components of medium frequency, a method of reducing the spurious signals that comprises reducing the relatively-low-frequency and the relatively-high-frequency components with the spurious signals at low signal levels, controlling said reduction by the level of said unmodulated signals and maintaining a predetermined relationship between the relatively-low-frequency components and the relatively-high-frequency components.

3. In the transmission of unmodulated signals accompanied by spurious signals and having relatively-low-frequency components, relatively-high-frequency components, and components of medium frequency, a method of reducing the spurious signals that comprises reducing the relatively-high-frequency components and the relatively-low-frequency components with the spurious signals at relatively-low-volume levels of the signals, said reduction being controlled by said unmodulated signals.

4. In the transmission of unmodulated signals accompanied by spurious signals and having relatively-low-frequency components, relatively-high-frequency components, and components of medium frequency, a method of reducing the spurious signals that comprises reducing the relatively-low-frequency components and the relatively-high-frequency components with the spurious signals when the level of the signals falls below a predetermined value, and maintaining a predetermined relationship between the relatively-low-frequency components and the relatively-high-frequency components, said reduction being controlled by said unmodulated signals.

5. In the transmission of unmodulated signals having relatively-high-frequency components, relatively-low-frequency components the level of which is large compared to the level of the relatively-high-frequency components, and components of medium frequency, a method of the character described that comprises reducing the relatively-high-frequency components and relatively-low-frequency components when the level of the signals falls below a predetermined value, and maintaining a predetermined relationship between the relatively-low-frequency components and the relatively-high-frequency components, said reduction being controlled by said unmodulated signals.

6. An electric system having, in combination, means for transmitting unmodulated signals having relatively-low-frequency components, relatively-high-frequency components, and components of medium frequency, means for reducing the relatively-high-frequency components and the relatively-low-frequency components at low signal levels, means controlled in accordance with said unmodulated signals for controlling the reducing means to control the amount of reduction of the relatively-high-frequency components and the relatively-low-frequency components, and means for maintaining a predetermined relationship between the relatively-high-frequency components and the relatively-low-frequency components.

7. An electric system having, in combination, means for transmitting signals accompanied by spurious signals and having relatively-low-frequency components, relatively-high-frequency components, and components of medium frequency, the transmitting means comprising means for controlling the transmitting means to reduce the relatively-high-frequency components and the relatively-low-frequency components with the spurious signals and means for rendering said controlling means effective when the level of predetermined components below said relatively-high-frequency components falls below a predetermined value.

8. An electric system having, in combination, means for transmitting unmodulated signals accompanied by spurious signals and having relatively-low-frequency components, relatively-high-frequency components, and components of medium frequency, means controlled in accordance with said unmodulated signals for controlling the transmitting means to reduce the relatively-high-frequency components and the relatively-low-frequency components with the spurious signals at low signal levels, and means for maintaining a predetermined relationship between the relatively-high-frequency components and the relatively-low-frequency components.

9. An electric system having, in combination, means for transmitting unmodulated signals accompanied by spurious signals and having relatively-low-frequency components, relatively-high-frequency components, and components of medium frequencies, means effective when the level of said unmodulated signals falls below a predetermined value and controlled in accordance with said unmodulated signals for controlling the transmitting means to reduce the relatively-high-frequency components and the relatively-low-frequency components with the spurious signals, and means for maintaining a predetermined relationship between the relatively-high-frequency components and the relatively-low-frequency components the transmission of said medium-frequency-components remaining substantially unchanged.

10. An electric system having, in combination, means for transmitting signals having relatively-low-frequency components, relatively-high-frequency components, and components of medium frequency, means controlled in accordance with the signals for controlling the transmitting means to reduce the relatively-high-frequency components, means controlled in accordance with the signals for controlling the transmitting means to reduce the relatively-low-frequency components, and means for controlling the first-named controlling means at a more rapid rate than the second-named controlling means.

11. An electric system having, in combination, means for transmitting unmodulated signals accompanied by spurious signals and having relatively-low-frequency components, relatively-high-frequency components, and components of medium-frequency, means for reducing the relatively-high-frequency components and the relatively-low-frequency components with the spurious signals and means for rendering said reducing means ineffective when the level of said unmodulated signals exceeds a predetermined value, but effective when the level of said unmodulated signals falls below a predetermined value.

12. An electric system having, in combination, means for transmitting unmodulated signals having relatively-low-frequency components, relatively-high-frequency components, and components of medium frequency. and means capacitive at relatively-high frequencies and inductive at relatively-low frequencies for reducing the relatively-low-frequency components and the relatively-high-frequency components, and means for controlling said reducing action in accordance with the signals to reduce the relatively-high-frequency components and relatively-low-frequency components at low signal levels.

13. An electric system having, in combination, means for transmitting signals having relatively-low-frequency components, relatively-high-frequency components, and components of medium frequency, the transmitting means comprising a filter having a plurality of reactive arms, at least one of said arms being essentially capacitive at relatively high frequencies, and essentially inductive at relatively low frequencies, and means controlled in accordance with the signals for varying both capacitive and inductive components of said arm to reduce simultaneously the relatively-high-frequency components and the relatively-low-frequency components at low signal levels while maintaining substantially constant transmission of said components of medium frequency.

14. An electric system having, in combination, means for transmitting unmodulated signals having relatively-low-frequency components, relatively-high-frequency components, and components of medium frequency, the transmitting means comprising filter means having cut-offs at predetermined frequencies for reducing the relatively-low-frequency components and the relatively-high-frequency components, and means effective when the level of the unmodulated signals falls below a predetermined value for varying the cut-off frequencies to reduce the band width.

15. An electric system having, in combination, means for transmitting unmodulated signals having relatively-low-frequency components, relatively-high-frequency components, and components of medium frequency, the transmitting means comprising filter means having cut-offs at predetermined frequencies for reducing the relatively-low-frequency components and the relatively-high-frequency components, and means for varying the high-frequency cutoff to a lower frequency and the low-frequency cutoff to a higher frequency in a predetermined relationship when the level of the unmodulated signals falls below a predetermined value and means causing said variations in high frequency and low frequency cutoffs to take place at different rates.

16. An electric system having, in combination, means for transmitting unmodulated signals having relatively low-frequency components, relatively high-frequency components, and components of medium frequency, the transmitting means comprising a filter having a plurality of reactive arms, and means effective when the level of said unmodulated signals falls below a predetermined value for varying the reactance of a plurality of said arms to reduce the relatively high-frequency components and the relatively low-frequency components.

17. An electric system having, in combination means for transmitting signals having relatively-low-frequency components, relatively-high-frequency components, and components of medium frequency, means controlled in accordance with the signals for controlling the transmitting means to reduce the relatively-high-frequency components, means controlled in accordance with the signals for controlling the transmitting means to reduce the relatively-low-frequency components, the output one of said controlling means being connected to the input of the other said controlling means, and means for controlling the first-named controlling means at a more rapid rate than the second-named controlling means.

18. An electric system having, in combination, means for transmitting signals having relatively-low-frequency components, relatively-high-frequency components, and components of medium frequency, means controlled in accordance with the signals for controlling the transmitting means to reduce the relatively-high-frequency components, means controlled in accordance with the signals for controlling the transmitting means to reduce the relatively-low-frequency components, the transmission of said medium frequency components remaining relatively unaffected, and means for controlling the first-named controlling means at a more rapid rate than the second-named controlling means.

19. An electric system comprising means for transmitting unmodulated signals having high-frequency components, medium-frequency components and low-frequency components, means for reducing the transmission of said high-frequency components and said low-frequency components at low signal levels, said means comprising a filter network having at least two arms, one of said arms comprising an impedance and the other comprising a vacuum tube and means for controlling said vacuum tube by said unmodulated signals to control said reduction.

20. An electric system comprising means for transmitting unmodulated signals having high-frequency components, medium-frequency components and low-frequency components, means for reducing the transmission of said high-frequency components and said low-frequency components at low signal levels, said means comprising a filter network having at least two arms, one of said arms comprising a reactance and the other comprising a vacuum tube and means for controlling said vacuum tube by said unmodulated signals to control said reduction.

21. An electric system comprising means for transmitting unmodulated signals having high-frequency components medium-frequency components and low-frequency components, means for reducing the transmission of said high-frequency components and said low-frequency components at low signal levels, said means comprising a filter network having at least two arms, one of said arms comprising an impedance and the other comprising a reactance tube and means for controlling said reactance tube by said unmodulated signals to control said reduction.

22. An electric system comprising means for transmitting unmodulated signals having high-frequency components, medium-frequency components and low-frequency components, means for reducing the transmission of said high-frequency components at low signal levels, said means comprising a filter network having at least two arms, one of said arms comprising an impedance and the other comprising a vacuum tube, means for controlling said vacuum tube by said unmodulated signals to control said reduction, and means for automatically reducing said low-frequency components in predetermined balance with said high-frequency components.

23. An electric system comprising means for transmitting unmodulated signals having low-frequency components, medium-frequency components and high-frequency components, means for reducing the transmission of said low-frequency components at low signal levels, said means comprising a filter network having at least two arms, one of said arms comprising an impedance and the other comprising a vacuum tube, means for controlling said vacuum tube by said unmodulated signals to control said reduction, and means for automatically reducing said high-frequency components in predetermined balance with said low-frequency components.

24. An electric system comprising means for transmitting unmodulated signals having high-frequency components, medium-frequency components and low-frequency components, means for reducing the transmission of said high-frequency components at low signal levels, said means comprising a filter network having at least two arms, one of said arms comprising an impedance and the other comprising a reactance tube, means for controlling said reactance tube by said unmodulated signals to control said reduction, and means for automatically reducing said low-frequency components in predetermined balance with said high-frequency components.

25. An electric system comprising means for transmitting unmodulated signals having low-frequency components, medium-frequency components and high-frequency components, means for reducing the transmission of said low-frequency components at low signal levels, said means comprising a filter network having at least two arms, one of said arms comprising an impedance and the other comprising a reactance tube, means for controlling said reactance tube by said unmodulated signals to control said reduction, and means for automatically reducing said high-frequency components in predetermined balance with said low-frequency components.

26. A system for transmitting unmodulated signals having low, medium and high frequency components and comprising a transmission circuit and means for reducing the transmission of said low and high frequency components at low signal levels, said reducing means comprising at least one vacuum tube, means coupled to said transmission circuit providing a variable control voltage controlled by said unmodulated signals and having low frequency alternating components, means applying said control voltage to said vacuum tube, means coupling at least one of said vacuum tubes to said transmission circuit, said means further comprising means reducing transmission of said alternating components from said vacuum tube to said transmission circuit.

27. A system as in claim 6 in which said control means comprises further frequency-selective means having sensitivity characteristics approximating those of the human ear.

HERMON H. SCOTT.

REFERENCES CITED

The following references are of record in the file of this patent:

UNITED STATES PATENTS

| Number | Name | Date |
|---|---|---|
| 2,008,702 | Hammond, Jr. | July 23, 1935 |
| 2,045,300 | Koch | June 23, 1936 |
| 2,072,708 | Case | Mar. 2, 1937 |
| 2,096,760 | Purington | Oct. 26, 1937 |
| 2,113,332 | Morse et al. | Apr. 5, 1938 |
| 2,144,565 | Dreisbach | Jan. 17, 1939 |
| 2,236,364 | Case | Mar. 25, 1941 |
| 2,243,921 | Rust et al. | June 3, 1941 |
| 2,256,072 | Bruck | Sept. 16, 1941 |
| 2,262,846 | Herold | Nov. 18, 1941 |
| 2,320,558 | Boucke | June 1, 1943 |
| 2,330,216 | Hoover, Jr. | Sept. 28, 1943 |
| 2,425,968 | Tunick | Aug. 19, 1947 |